(12) United States Patent
Zhou (10) Patent No.: US 9,799,375 B2
(45) Date of Patent: Oct. 24, 2017

(54) METHOD AND DEVICE FOR ADJUSTING PLAYBACK PROGRESS OF VIDEO FILE (71) Applicant: ZTE Corporation, Shenzhen (CN)

(72) Inventor: Peng Zhou, Shenzhen (CN)

(73) Assignee: XI'AN ZHONGXING NEW SOFTWARE CO. LTD, Xi'an (CN)

( * ) Notice: Subject to any disclaimer, the term of this patent is extended or adjusted under 35 U.S.C. 154(b) by 0 days.

(21) Appl. No.: 14/890,186

(22) PCT Filed: Sep. 27, 2013

(86) PCT No.: PCT/CN2013/084520
§ 371 (c)(1),
(2) Date: Nov. 10, 2015

(87) PCT Pub. No.: WO2014/161282
PCT Pub. Date: Oct. 9, 2014

(65) Prior Publication Data
US 2016/0133298 A1   May 12, 2016

(30) Foreign Application Priority Data

Jul. 15, 2013   (CN) .......................... 2013 1 0295470

(51) Int. Cl.
*G11B 27/28*   (2006.01)
*H04N 21/439*   (2011.01)
(Continued)

(52) U.S. Cl.
CPC ........ *G11B 27/28* (2013.01); *G06F 17/30796* (2013.01); *G06F 17/30823* (2013.01);
(Continued)

(58) Field of Classification Search
CPC ......... G06F 17/30864; G06F 17/30905; G06F 17/289; H04N 2201/326
See application file for complete search history.

(56) References Cited

U.S. PATENT DOCUMENTS

2001/0014891 A1*   8/2001   Hoffert ............. G06F 17/30017
2003/0046075 A1*   3/2003   Stone ................. G06F 17/2809
704/257
(Continued)

FOREIGN PATENT DOCUMENTS

CN   101102419 A   1/2008
CN   101382937 A   3/2009
(Continued)

OTHER PUBLICATIONS

International Search Report for corresponding application PCT/CN2013/084520 filed Sep. 27, 2013; Mail date Apr. 25, 2014.
(Continued)

*Primary Examiner* — Hung Dang
*Assistant Examiner* — Sunghyoun Park
(74) *Attorney, Agent, or Firm* — Cantor Colburn LLP (57) ABSTRACT

Provided are a method and device for adjusting playback progress of a video file. The method includes: receiving text information to be searched; searching, in a caption file of the video file, for caption content matching the text information, wherein the caption file is acquired from the video file or generated according to the video file; and determining playback time point corresponding to the caption content according to the found caption content, and adjusting the playback progress of the video file according to the playback time point. According to the technical solution provided in the disclosure, accurate positioning of a clip which a user expects to replay is achieved, and the operation is simple and convenient.

16 Claims, 3 Drawing Sheets

Text information to be searched is received — S102

Caption content matching the text information in a caption file of the video file is searched for, wherein the caption file is acquired from the video file or generated according to the video file — S104

Playback time point corresponding to the caption content is determined according to the searched caption content, and the playback progress of the video file is adjusted according to the playback time point — S106

(51) Int. Cl.
*H04N 21/4402* (2011.01)
*H04N 21/472* (2011.01)
*H04N 21/482* (2011.01)
*H04N 21/488* (2011.01)
*G06F 17/30* (2006.01)
*G10L 15/26* (2006.01)

(52) U.S. Cl.
CPC . *H04N 21/4394* (2013.01); *H04N 21/440236* (2013.01); *H04N 21/47217* (2013.01); *H04N 21/4828* (2013.01); *H04N 21/4884* (2013.01); *G10L 15/26* (2013.01)

(56) References Cited

U.S. PATENT DOCUMENTS

| | | | | |
|---|---|---|---|---|
| 2007/0016846 A1* | 1/2007 | Ryu | ............... | H04N 9/8205 715/202 |
| 2007/0255565 A1* | 11/2007 | Yu | ............... | G06F 17/30038 704/251 |
| 2009/0067812 A1 | 3/2009 | Park | | |
| 2010/0106482 A1* | 4/2010 | Hardacker | ............ | G06F 17/289 704/3 |
| 2012/0275761 A1 | 11/2012 | Li et al. | | |
| 2012/0316860 A1* | 12/2012 | Reitan | ............... | G06F 17/289 704/2 |

FOREIGN PATENT DOCUMENTS

| | | |
|---|---|---|
| CN | 101739450 A | 6/2010 |
| CN | 101908053 A | 12/2010 |
| EP | 0780777 A1 | 6/1997 |
| EP | 2736250 A2 | 5/2014 |

OTHER PUBLICATIONS

Douglas W. Oard, A Comparative Study of Query and Document Translation for Cross-Language Information Retrieval, AMTA, Oct. 28, 1998, XP055028048.

European Search Report for corresponding application EP13880926; Report dated Apr. 4, 2016.

\* cited by examiner

METHOD AND DEVICE FOR ADJUSTING PLAYBACK PROGRESS OF VIDEO FILE

TECHNICAL FIELD

The disclosure relates to the communications field, and in particular to a method and device for adjusting playback progress of a video file.

BACKGROUND

With continuous improvement of processing capacity of smart mobile terminals and continuous increase of display screens, a video player has gradually become an application program generally installed in the smart mobile terminals. Currently, most of the smart mobile terminals are equipped with touch screens, and a user can operate and control the application program by touching a screen through at least one finger. When paying a video, a video player of this kind of smart mobile terminal may usually displays a progress bar, a total time length of the video and currently played time point on the screen. In addition, the progress bar is generally provided with a slider which will move forward in a process of video playback, and the position of the slider in the progress bar corresponds to the progress of the video playback. Of course, the user also can use a finger to drag the slider back and forth, at the moment, video content displayed on the screen and the currently played time point will be updated accordingly, and the user can view the video content or the currently played time point during a process of dragging the slider so as to position a playback position of interest.

However, the above-mentioned method of positioning the playback content is not convenient, and this kind of positioning method is merely suitable for the user to position according to played time point and is not suitable for some other scenes. For example, the user has previously seen a video currently played and has an impression on a certain picture or a certain sentence which is said by someone, and this may be a case where the user remembers a certain knowledge point taught by a teacher when viewing a teaching video and also may be a case where the user remembers some classic lines when watching a movie. If the user wants to search and position a video according to the above-mentioned clues, the slider on the progress bar needs to be dragged back and forth to look at the corresponding video content or speech of the persons in the video until the user can find the playback position of the video impressed in the mind of the user.

SUMMARY

The embodiments of the disclosure provide a method and device for adjusting playback progress of a video file, so as to at least solve the problem in the related art that the method for a user of a mobile terminal to search a specific fragment in the viewed videos is complex, and the accuracy for positioning the playback progress of a specific fragment is relatively poor.

According to one aspect of the embodiments of the disclosure, a method for adjusting playback progress of a video file is provided.

The method for adjusting the playback progress of the video file of the embodiments of the disclosure comprises: receiving text information to be searched; searching, in a caption file of the video file, for a caption content matching the text information, wherein the caption file is acquired from the video file or generated according to the video file; and determining playback time point corresponding to the caption content according to the found caption content, and adjusting the playback progress of the video file according to the playback time point.

According to another aspect of the embodiments of the disclosure, a device for adjusting playback progress of a video file is provided.

The device for adjusting the playback progress of a video file of the embodiments of the disclosure includes: a receiving component, configured to receive text information to be searched; a searching component, configured to search, in a caption file of the video file, a caption content matching the text information, wherein the caption file is acquired from the video file or generated according to the video file; and an adjusting component, configured to determine playback time point corresponding to the caption content according to the found caption content, and adjust the playback progress of the video file according to the playback time point.

The above technical solution has the following beneficial effects: by means of receiving text information to be searched; searching, in a caption file of the video file, for caption content matching the text information, wherein the caption file is acquired from the video file or generated according to the video file; and determining the playback time point corresponding to the caption content according to the found caption content, and adjusting the playback progress of the video file according to the playback time point, therefore, the mobile terminal can determine text information that a user is to search and then matches the text information with the text information in the caption file of the video file. If the matching caption content can be searched, the playback time point corresponding to the caption content is acquired so as to accurately adjust the playback progress of the video file according to the playback time point, thereby solving the problem in the related art that the method for searching, by the user of the mobile terminal, a specific fragment in the viewed videos is complex, and the accuracy for positioning the playback progress of the specific fragment is relatively poor, the accurate positioning of a clip which the user expects to replay is achieved, and the operation is simple and convenient.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF EMBODIMENTS

The disclosure is described below with reference to the accompanying drawings and embodiments in detail. Note that, the embodiments of the disclosure and the features of the embodiments can be combined with each other if there is no conflict.

Figure 1:
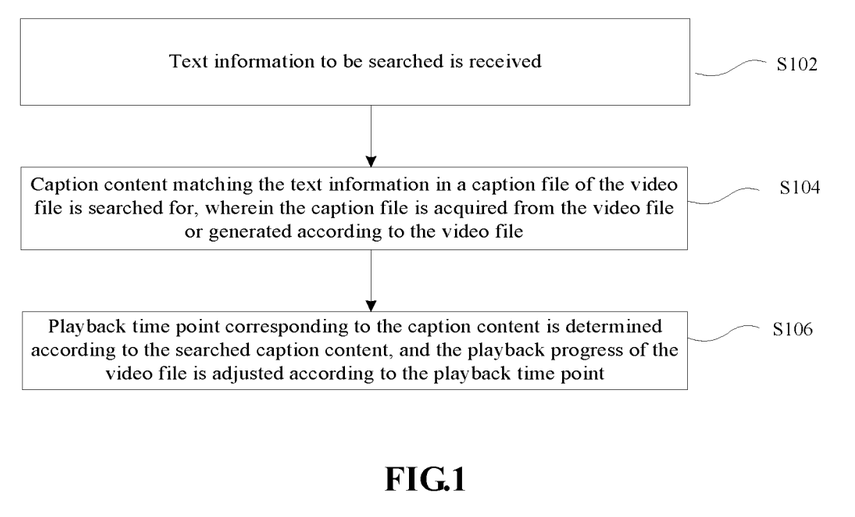
FIG. 1 is a flowchart of a method for adjusting playback progress of a video file according to an embodiment of the disclosure.

FIG. 1 is a flowchart of a method for adjusting playback progress of a video file according to an embodiment of the disclosure. As shown in FIG. 1, the method may include the following processing steps:

Step S102, text information to be searched is received.

Step S104, caption content matching the text information in a caption file of the video file is searched, wherein the caption file is acquired from the video file or generated according to the video file; and Step S106, playback time point corresponding to the caption content is determined according to the found caption content, and the playback progress of the video file is adjusted according to the playback time point.

In the related art, the method for searching, by a user of a mobile terminal, a specific fragment in the viewed videos is complex, and the accuracy for positioning the playback progress of the specific fragment is relatively poor. By using the method as shown in FIG. 1, by means of receiving text information to be searched; searching caption content matching the text information in the caption file of the video file, wherein the caption file is acquired from the video file or generated according to the video file; and determining the playback time point corresponding to the caption content according to the found caption content, and adjusting the playback progress of the video file according to the playback time point, the mobile terminal can determine text information that the user is to search and then match the text information with the text information in the caption file of the video file, if the matching caption content can be searched, the playback time point corresponding to the caption content is acquired so as to accurately adjust the playback progress of the video file according to the playback time point, thereby solving the problem in the related art that the method for searching, by the user of the mobile terminal, the specific fragment in the viewed videos is complex, and the accuracy for positioning the playback progress of the specific fragment is relatively poor, the accurate positioning of the clip which the user expects to replay is achieved, and the operation is simple and convenient.

In an example embodiment, in step S104, before the caption content matching the text information is searched for, the method further includes the following operations:

Step S1, whether there is a caption file in the video file is judged; and

Step S2, if the caption file does not exist in the video file, the caption file is generated according to audio data in the video file.

In an example embodiment, if the video file has loaded the caption file having a default format (such as srt format), then the caption file corresponding to the video file can be directly acquired from the local video file. Of course, the corresponding caption file can be downloaded from a website which specifically provides captions. If the video file lacks a corresponding caption file, then the corresponding caption file can be generated by collecting audio data in the video file.

The caption file may be a text file in which various segments of caption information in the video file are described, in addition, each segment of caption information can include: a caption sequence number, start time point and caption content. The caption file may be of various formats, for example, one kind format of the caption file is a format of srt, and a filename of this kind of caption file usually uses .srt as a suffix. The format of each segment of caption is as follows:

caption sequence number
start time point→end time point
caption text (one or more lines)
blank line The caption sequence number is generally numbered from 1, and the used time format is "hour: minute: second, millisecond". The following is an example of the caption file of which the format is srt:
1
00:00:10,500→00:00:13,000
Elephant's Dream
2
00:00:15,000→00:00:18,000
At the left we can see . . .

The above-mentioned caption file includes two segments of captions, wherein the start time point of the first segment of caption is from 10.5 seconds to 13 seconds, the caption content is Elephant's Dream, the start time point of the second segment of caption is from 15 seconds to 18 seconds, and the caption content is At the left we can see . . .

In an example embodiment, in step S2, generating the caption file according to audio data can include the following operations:

Step S21: decoding processing on the audio data in the video file is performed; and Step S22: the decoded audio data is converted into the caption file.

In an example embodiment, a voice/video decoder of the mobile terminal performs decoding on in the video file, and then the decoded audio data is converted into a text of a specific language (such as Chinese or English).

In an example embodiment, in step S104, before the caption content matching the text information is searched for, the method further includes the following steps:

Step S3: whether a language used by the caption file is consistent with a language used by the text information is judged; and Step S4: if the language used by the caption file is not consistent with the language used by the text information, the language used by the caption file is translated to consist with the language used by the text information, or the caption file is regenerated according to the language used by the text information.

In an example embodiment, in the case where the mobile terminal has determined text information that the user is to search and has acquired or generated the caption file corresponding to the video file, if the user desires to match the determined text information that the user is to search with the caption file corresponding to the video file, it needs to ensure that the language used by the determined text information that the user is to search and the language used by the caption file corresponding to the video file are kept to be consistent. Therefore, if the language used in caption file and the language used when the user performs a voice search are the same, the video player can allow the user to specify the caption file. However, if the video file does not load the caption file, or the language used by the loaded caption file is different from the language used by the user, at this moment, it needs to translate the language used by the caption file to be consistent with the language used by the text information or regenerate the caption file according to the language used by the text information.

In an example embodiment, in step S106, the playback time point corresponding to the caption content is determined according to the found caption content, and adjusting the playback progress of the video file according to the playback time point includes the following processing steps:

Step S5, a caption sequence number of the caption content is determined according to the found caption content;

Step S6, a playback time period corresponding to the found caption content is acquired according to the caption sequence number, and initial playback time point corresponding to the found caption content is determined within the playback time period; and Step S7, the playback progress is adjusted according to the playback time point.

In an example embodiment, although the caption file may be of many formats, the caption files of various formats include a plurality of segments of caption information, and each segment of the caption information may include: a caption sequence number, playback time point and caption content. After the caption content matching the text information that the user is to search in the caption file, the caption sequence number of this segment of caption content can be further determined, and the playback time period (including start time point and end time point) corresponding to this segment of caption content can be further determined according to the caption sequence number, and therefore the initial playback time point of this segment of caption content can be determined, so as to adjust the playback progress according to the playback time point. Take the above-mentioned caption file of which the format is srt as an example, assume that the text information to be searched is "At the left we can see . . . ", and the caption information matching the text information is indeed searched in the caption file, which is specifically as follows:

2
00:00:15,000→00:00:18,000
At the left we can see . . .

Thus, it can be determined that the caption sequence number of this segment of caption content is 2, and the playback time period corresponding to the caption sequence number 2 is 00:00:15,000→00:00:18,000, i.e. the initial playback time point is 00:00:15,000; therefore, the playback progress of the video file can be adjusted according to the playback time point.

In an example embodiment, in step S102, the manner of receiving the text information may include but not limited to by one of the following:

manner I, receiving input text information; and manner II, receiving audio data, and converting the audio data into the text information.

In an example embodiment, the user of the mobile terminal can input text information to be searched into a search dialog box of a video player by a keyboard or a touch screen, and also can input the text information to be searched into the mobile terminal by way of voice through a microphone.

Figure 2:
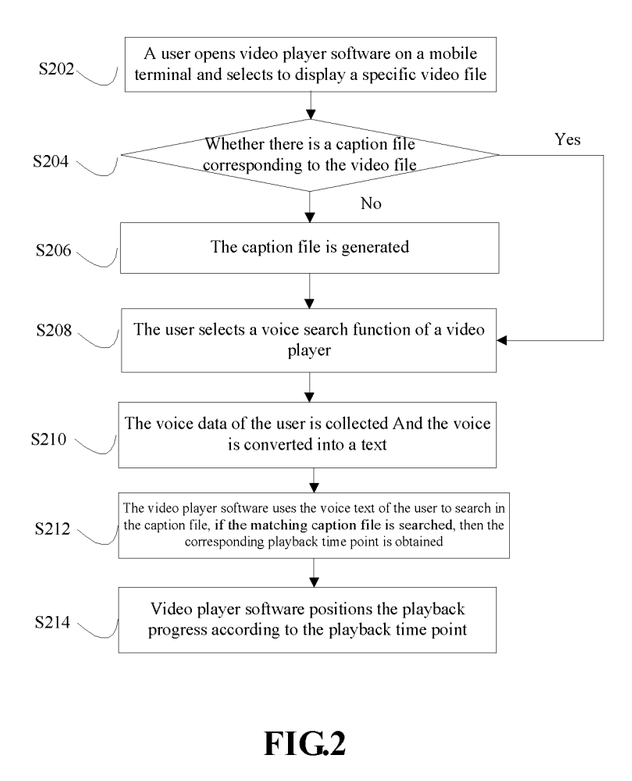
FIG. 2 is a flowchart of a method for adjusting playback progress of a video file according to a preferred embodiment of the disclosure.

The above-mentioned implementation process will be further described in combination with the example embodiment as shown in FIG. 2 below.

FIG. 2 is a flowchart of a method for adjusting playback progress of a video file according to a preferred embodiment of the disclosure. As shown in FIG. 2, the flow includes the following processing steps:

Step S202: a user opens a video player software on a mobile terminal and selects to display a specific video file;

step S204: the use searches whether there is a caption file corresponding to the video file and specifies a caption file in the video player; if there is a caption file corresponding to the video file, then proceeding to step S208; and if there is not a caption file corresponding to the video file, continuing to conduct step S206;

Step S206, if there is not a caption file corresponding to the video file, a voice/video decoder of the mobile terminal is used to perform decoding on audio data in the video file, and then to convert the decoded audio data into a text format of a specific language (such as Chinese or English) and time information is simultaneously recorded, that is, a new caption file is generated;

Step S208, the user selects to use a voice search function to search the video content;

Step S210, the video player software converts the voice data, which is input by the user through the microphone, into a text of a specific format;

Step S212, the video player software uses the converted voice text of the user to search in the caption file, if the matching caption file is searched, then playback time point corresponding to the caption can be obtained; and Step S214, the video player software uses the playback time point to adjust the playback progress of the video file.

Figure 3:
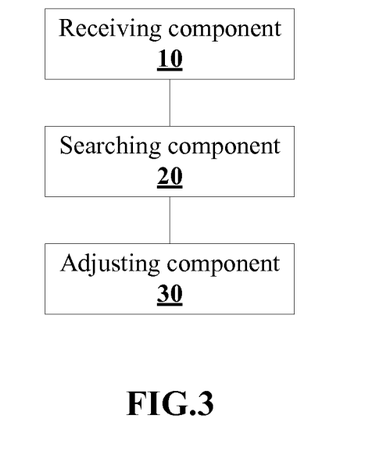
FIG. 3 is a structural diagram of a device for adjusting playback progress of a video file according to an embodiment of the disclosure.

FIG. 3 is a structural diagram of a device for adjusting playback progress of a video file according to an embodiment of the disclosure. As shown in FIG. 3, the device for adjusting the playback progress of a video file includes: a receiving component 10, configured to receive text information to be searched; a searching component 20, configured to search, in a caption file of the video file, for caption content matching the text information in a caption file of the video file, wherein the caption file is acquired from the video file or generated according to the video file; and an adjusting component 30, configured to determine playback time point corresponding to the caption content according to the found caption content, and adjust the playback progress of the video file according to the playback time point.

The device as shown in FIG. 3 is used to solve the problem in the related art that the method for a user of a mobile terminal to search a specific fragment in the viewed videos is complex, and the accuracy for positioning the playback progress of the specific fragment is relatively poor, accurate positioning of a clip which a user expects to replay is achieved, and the operation is simple and convenient.

Figure 4:
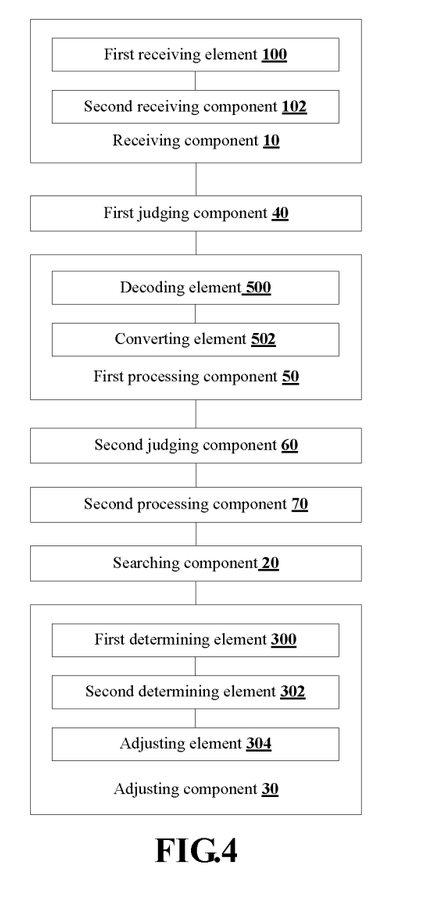
FIG. 4 is a structural diagram of a device for adjusting playback progress of a video file according to a preferred embodiment of the disclosure.

In an example embodiment, as shown in FIG. 4, the above-mentioned device can further include: a first judging component 40, configured to judge whether the caption file exists in the video file; and a first processing component 50, configured to generate the caption file according to audio data in the video file if the caption file does not exist in the video file.

In an example embodiment, as shown in FIG. 4, the first processing component 50 can include: a decoding element 500, configured to perform decoding processing on the audio data in the video file; and a converting element 502, configured to convert the decoded audio data into the caption file.

In an example embodiment, as shown in FIG. 4, the above-mentioned device may further include: a second judging component 60, configured to judge whether a language used by the caption file is consistent with the language used by the text information; and a second processing component 70, configured to translate the language used by the caption file into the language being consistent with the language used by the text information or regenerate the caption file according to the language used by the text information, if the language used by the caption file is not consistent with the language used by the text information.

In an example embodiment, as shown in FIG. 4, the adjusting component 30 also may include: a first determining element 300, configured to determine a caption sequence number of the caption content according to the searched caption content; a second determining element 302, configured to acquire a playback time period corresponding to the searched caption content according to the caption sequence number, and determine initial playback time point corresponding to the searched caption content within the playback time period; and an adjusting element 304, configured to adjust the playback progress according to the playback time point.

In an example embodiment, as shown in FIG. 4, the receiving component 10 may further include: a first receiving element 100, configured to receive input text information; and a second receiving component 102, configured to receive audio data, and convert the audio data into the text information.

Figure 5:
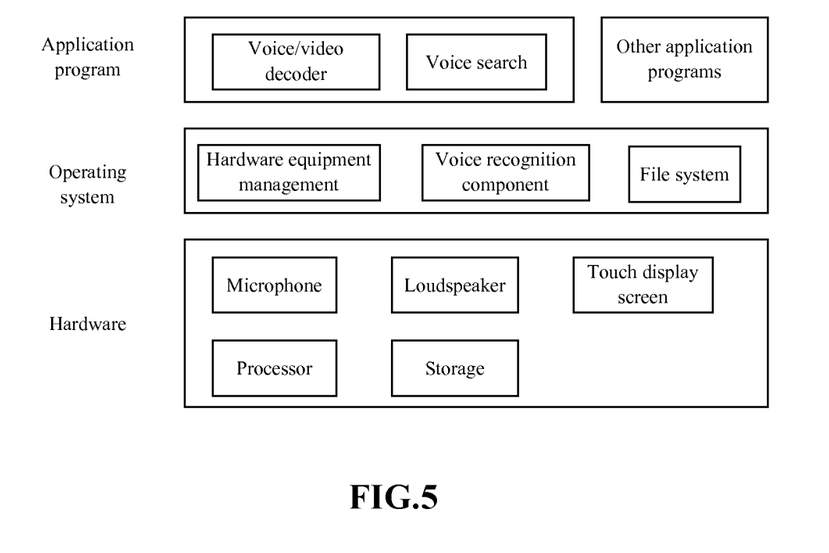
FIG. 5 is a schematic diagram of hardware and software architectures of a smart mobile terminal according to a preferred embodiment of the disclosure.

The above-mentioned implementation process will be further described in combination with the example embodiment as shown in FIG. 5 below.

FIG. 5 is a schematic diagram of hardware and software architectures of a smart mobile terminal according to a preferred embodiment of the disclosure. The architecture can be divided into three levels, i.e., a hardware layer, an operating system layer and an application program layer from bottom to top. The hardware layer may include: a processor, a memory, a microphone, a loudspeaker and a touch display screen. The operating system layer is responsible for managing one or more hardware equipments and providing one or more file systems and a function program library, wherein the function program library may include: a voice recognition component (equivalent to the first processing component and the determining component mentioned above). The role of the voice recognition component lies in converting voice data into corresponding text content. The application program layer may include: a plurality of application programs, such as a video player and a calculator. The video player may include: a voice/video decoder which can decode one or more video files and then display one or more images on the display screen and display sound through the loudspeaker. The technical solution provided by the disclosure may newly add a function component in the video player, and can name the function as voice search in a video image displayed on the display screen (equivalent to the above-mentioned search component and adjusting component).

When the user uses the video player to view one or more videos, the function of voice search can be selected to use. At this moment, the user can say a sentence which is expected to be retrieved in the mind, and then the voice search component can search the corresponding audio data in the video file according to the caption content of the sentence said by the user, so as to search a matching item. If the matching item can be searched, then a slider of a progress bar of the video player is positioned to a corresponding position.

In an example embodiment, the voice search component needs to have the following preconditions to complete the above-mentioned work:

Condition I, a software system of the smart mobile terminal includes: a voice recognition component which can be provided by an operating system or other application programs, and the video player software can use the voice recognition component. For example, the voice recognition component can receive an audio input of a default format (such as Pulse Code Modulation (PCM)), and convert the audio input into a text of a specific language (such as Chinese or English).

Condition II, the voice/video decoder in the video player can recognize the format (such as MP4, AVI) of the video file and decode the audio data in the video file into a format which can be received by the voice recognition component.

Condition III, the voice search component can collect the voice data said by the user from the microphone through the operating system, and these voice data can be received by the voice recognition component.

As an example embodiment of the disclosure, the caption file of which the format is srt can be used as an example to further describe the positioning of the text information which is desired to be searched by the user in the video file, of course, in a specific implementation process, the caption files of other formats also can be used, which does not limit the disclosure herein. The whole process specifically comprises the following several steps:

In the first step, the audio decoder in the video player is used to decode the audio data in the video file into a format (such as PCM format) which can be recognized by the voice recognition component, and the format is stored into the audio file.

In the second step, the above-mentioned audio file is analysed, and the caption file is generated. The voice data in the audio file is read circularly, the voice data can be read for one second every time, secondly, the audio data which is read in this one second is input to the voice recognition component to generate a corresponding caption text, and then a segment of caption information is generated according to the format of srt and is stored in the caption file. According to the above-mentioned method, if the length of the video file is N seconds, then N segments of captions may be generated in the caption file.

In the third step, the video file is searched and positioned. When the user starts using the voice search function, the user says a sentence which is desired to be retrieved in the video file, the voice search component collects the voice data said by the user from the microphone, and then the voice data is input to the voice recognition component to generate a corresponding text. Subsequently, a voice search component searches the generated text mentioned above in the caption file, if the matching text is searched, the playback time point corresponding to the matching text can be obtained according to the format of the caption file. Finally, the video player is positioned according to the playback time point.

It can be seen from the above description that the above-mentioned embodiments realize the following technical effects (it needs to be noted that these effects are effects which can be achieved by certain example embodiments): by using the technical solution provided by the embodiments of the disclosure, a new method and device for adjusting the playback progress of the video file are provided for the user, the mobile terminal can determine text information that the user is to search and then match the text information and the text information in the caption file of the video file, if a matching caption content can be searched, the playback time point corresponding to the caption content is acquired so as to accurately adjust the playback progress of the video file according to the playback time point, thereby solving the problem in the related art that the method for the user of the mobile terminal to search a specific fragment in the viewed videos is complex, and the accuracy for positioning the playback progress of the specific fragment is relatively poor, accurate positioning of a clip which the user expects to replay is achieved, and the operation is simple and convenient.

Obviously, those skilled in the art should know that each of the mentioned components or steps of the disclosure can be realized by universal computing devices; the components or steps can be focused on single computing device, or distributed on the network formed by multiple computing devices; selectively, they can be realized by the program codes which can be executed by the computing device; thereby, the components or steps can be stored in the storage device and executed by the computing device; and under some circumstances, the shown or described steps can be executed in different orders, or can be independently manufactured as each integrated circuit component, or multiple components or steps thereof can be manufactured to be single integrated circuit component, thus to be realized. In this way, the disclosure is not restricted to any particular hardware and software combination.

The descriptions above are only the preferable embodiment of the disclosure, which are not used to restrict the disclosure, for those skilled in the art; the disclosure may have various changes and variations. Any amendments, equivalent substitutions, improvements, etc. within the principle of the disclosure are all included in the scope of the protection of the disclosure.

What is claimed is:

1. A method for adjusting playback progress of a video file, comprising:
   receiving text information to be searched;
   searching, in a caption file of the video file, for caption content matching the text information, wherein the caption file is acquired from the video file or generated according to the video file; and
   determining playback time point corresponding to the caption content according to the found caption content, and adjusting the playback progress of the video file according to the playback time point;
   wherein before searching for the caption content matching the text information, the method further comprises: judging whether a language used by the caption file is consistent with a language used by the text information; and when the language used by the caption file is not consistent with the language used by the text information, regenerating the caption file according to the language used by the text information.

2. The method according to claim 1, wherein before searching for the caption content matching the text information, the method further comprises:
   judging whether the video file contains the caption file; and
   when the caption file does not exist in the video file, generating the caption file according to audio data in the video file.

3. The method according to claim 2, wherein generating the caption file according to the audio data in the video file comprises:
   performing decoding processing on the audio data in the video file; and
   converting the decoded audio data into the caption file.

4. The method according to claim 3, wherein receiving the text information comprises one of the following:
   receiving input text information; and
   receiving audio data, and converting the audio data into the text information.

5. The method according to claim 2, wherein receiving the text information comprises one of the following:
   receiving input text information; and
   receiving audio data, and converting the audio data into the text information.

6. The method according to claim 1, wherein determining the playback time point corresponding to the caption content according to the found caption content, and adjusting the playback progress according to the playback time point comprises:
   determining a caption sequence number of the caption content according to the found caption content;
   acquiring a playback time period corresponding to the found caption content according to the caption sequence number, and determining initial playback point corresponding to the found caption content within the playback time period; and
   adjusting the playback progress according to the playback time point.

7. The method according to claim 6, wherein receiving the text information comprises one of the following:
   receiving input text information; and
   receiving audio data, and converting the audio data into the text information.

8. The method according to claim 1, wherein receiving the text information comprises one of the following:
   receiving input text information; and
   receiving audio data, and converting the audio data into the text information.

9. A device for adjusting playback progress of a video file, comprising:
   a receiving component, configured to receive text information to be searched;
   a searching component, configured to search, in a caption file of the video file, for caption content matching the text information, wherein the caption file is acquired from the video file or generated according to the video file; and
   an adjusting component, configured to determine playback time point corresponding to the caption content according to the found caption content, and adjust the playback progress of the video file according to the playback time point;
   wherein the device further comprises: a second judging component, configured to judge whether a language used by the caption file is consistent with the language used by the text information; and a second processing component, configured to regenerate the caption file according to the language used by the text information, when the language used by the caption file is not consistent with the language used by the text information.

10. The device according to claim 9, wherein the device further comprises:
    a first judging component, configured to judge whether the video file contains the caption file; and
    a first processing component, configured to generate the caption file according to audio data in the video file when the caption file does not exist in the video file.

11. The device according to claim 10, wherein the first processing component comprises:
    a decoding element, configured to perform decoding processing on the audio data in the video file; and
    a converting element, configured to convert the decoded audio data into the caption file.

12. The device according to claim 11, wherein the receiving component comprises:
    a first receiving element, configured to receive input text information; and
    a second receiving component, configured to receive audio data, and convert the audio data into the text information.

13. The device according to claim 10, wherein the receiving component comprises:

a first receiving element, configured to receive input text information; and a second receiving component, configured to receive audio data, and convert the audio data into the text information.

14. The device according to claim 9, wherein the adjusting component comprises:

a first determining element, configured to determine a caption sequence number of the caption content according to the found caption content;

a second determining element, configured to acquire a playback time period corresponding to the found caption content according to the caption sequence number, and determine initial playback time point corresponding to the found caption content within the playback time period; and an adjusting element, configured to adjust the playback progress according to the playback time point.

15. The device according to claim 14, wherein the receiving component comprises:

a first receiving element, configured to receive input text information; and a second receiving component, configured to receive audio data, and convert the audio data into the text information.

16. The device according to claim 9, wherein the receiving component comprises:

a first receiving element, configured to receive input text information; and a second receiving component, configured to receive audio data, and convert the audio data into the text information.

* * * * *